US006066792A

United States Patent [19]

Sone

[11] Patent Number: 6,066,792

[45] Date of Patent: May 23, 2000

[54] MUSIC APPARATUS PERFORMING JOINT PLAY OF COMPATIBLE SONGS

[75] Inventor: Takuro Sone, Hamamatsu, Japan

[73] Assignee: Yamaha Corporation, Hamamatsu, Japan

[21] Appl. No.: 09/129,593

[22] Filed: Aug. 5, 1998

[30] Foreign Application Priority Data

Aug. 11, 1997 [JP] Japan .................................. 9-216842

[51] Int. Cl.[7] .............................. G09B 5/00; G10H 1/38; G10H 1/40; G10H 7/00

[52] U.S. Cl. ................................ 84/609; 84/611; 84/612; 84/613; 84/DIG. 12; 84/DIG. 22; 434/307 A

[58] Field of Search ............................ 84/609–614, 625, 84/631, 634–638, DIG. 12, DIG. 22; 434/307 A

[56] References Cited

U.S. PATENT DOCUMENTS 5,243,123 9/1993 Chaya .................................. 84/625 X
5,719,346 2/1998 Yoshida et al. ........................... 84/631
5,750,912 5/1998 Matsumoto ............................... 84/609
5,804,752 9/1998 Sone et al. ................................ 84/610
5,817,965 10/1998 Matsumoto ........................... 84/625 X
5,889,224 3/1999 Tanaka ............................ 434/307 A X

*Primary Examiner*—Stanley J. Witkowski
*Attorney, Agent, or Firm*—Pillsbury Madison & Sutro LLP

[57] ABSTRACT

A music apparatus is constructed for joint play of music pieces by processing song data. In the music apparatus, a storage device stores song data representing a plurality of music pieces. An operating device is used for designating a first music piece as an object of the joint play among the plurality of the music pieces stored in the storage device. A controller device automatically selects a second music piece from the plurality of the music pieces as another object of the joint play such that the second music piece has a musical compatibility with the first music piece. A processor device retrieves the song data of the first music piece and the song data of the second music piece from the storage device, and processes the song data retrieved from the storage device so as to merge the second music piece to the first music piece. A sound source operates based on the processed song data for jointly playing the first music piece and the second music piece such that the second music piece is reproduced in harmonious association with the first music piece due to the musical compatibility of the second music piece with the first music piece.

21 Claims, 9 Drawing Sheets

MUSIC APPARATUS PERFORMING JOINT PLAY OF COMPATIBLE SONGS

BACKGROUND OF THE INVENTION

1. Field of the Invention

The present invention generally relates to a music tone reproducing apparatus or music player that extracts a performance section from a music piece and mixes the extracted performance section with another music piece to perform a joint play of the music pieces.

2. Description of Related Art

As karaoke apparatuses have become widespread, needs of the market have been diversified. In the initial stage of karaoke history, it has been a general practice that a next karaoke song is performed only after the performance of a preceding karaoke song has been finished. Recently, some karaoke apparatuses provide a medley play composed of sections or phrases of two or more songs that most get into swing. In music terms, these sections are referred to as a release, bridge, or channel. Initially, a medley music has been provided as one piece of song data. Recently, some karaoke apparatuses can link and edit plural pieces of song data into a medley according to user's preferences. An editing technology has been proposed, in which the linking can be made smoothly by considering musical elements such as tempo, rhythm, and chord of the songs or music pieces to be linked with each other, thereby reducing a sense of incongruity that might otherwise be conspicuous.

Meanwhile, there is an interesting vocal play in which two or more songs hearing very much alike or compatible with each other are sung in parallel at the same time. Further, one song may be sung along with an accompaniment of another song. In implementing such interesting vocal plays on a karaoke system, plural songs may be simultaneously performed by using the above-mentioned technology, which is initially designed for the medley composition. For example, a transitional period is provided between the end of the performance section of a preceding song and the beginning of the performance section of a succeeding song immediately following the preceding song. In the transitional period, the preceding song and the succeeding song are performed in a superimposed manner.

However, simple performance of plural songs at the same time gives unnatural and confusing impressions, because different songs are normally incompatible with each other in terms of the music elements such as tempo, rhythm, and chord. Therefore, it is necessary for the songs to be simultaneously performed to be close or similar to each other with respect to the music elements. However, the conventional technology for linking plural songs does not check or evaluate whether a couple of songs have the music elements that will not cause a sense of incongruity when the songs are performed at the same time. Further, the simultaneous performing of plural songs requires synchronizing the songs with each other for reproduction of music tones. However, no technology for realizing this requirement has been developed.

SUMMARY OF THE INVENTION

It is therefore an object of the present invention to provide a music apparatus that mixes plural songs resembling each other for simultaneous performance.

The inventive music apparatus is constructed for performing a music piece based on song data. In the music apparatus, song storing means stores song data of a plurality of music pieces. Designating means designates a first music piece as an object of performance among the plurality of the music pieces stored in the song storing means. Selecting means selects from the plurality of the music pieces a second music piece having a part musically compatible with the first music piece. Processing means retrieves the song data of the first music piece and the song data of the second music piece from the song storing means, and processes the song data retrieved from the song storing means so as to mix the part of the second music piece into the first music piece. Performing means operates based on the processed song data for regularly performing the first music piece while mixing the part of the second music piece such that the second music piece is jointly performed in harmonious association with the first music piece.

Preferably, the music apparatus further comprises reference storing means for storing reference data representative of a music property of the music pieces stored in the song storing means. In such a case, the selecting means comprises means for examining the reference data of the stored music pieces so as to select the second music piece having a music property harmonious with that of the first music piece to thereby ensure musical compatibility of the second music piece with the first music piece.

Preferably, the song storing means is provided locally together with the selecting means. On the other hand, the reference storing means is provided remotely from the selecting means. In such a case, the selecting means remotely accesses the reference storing means and locally accesses the song storing means to select therefrom the second music piece.

Preferably, the reference storing means stores the reference data representative of the music property in terms of at least one of a chord, a rhythm and a tempo of each music piece stored in the song storing means.

Preferably, the selecting means includes analyzing means for analyzing a music property of the first music piece so as to select the second music piece having a music property harmonious with the analyzed music property of the first music piece to thereby ensure musical compatibility of the second music piece with the first music piece. Preferably, the analyzing means analyzes the music property of the first music piece in terms of at least one of a chord, a rhythm and a tempo.

Preferably, the music apparatus further comprises table storing means for storing table data that records correspondence between each music piece stored in the song storing means and other music piece stored in the song storing means such that the recorded correspondence indicates musical compatibility of the music pieces with each other. The selecting means comprises means for referencing the table data so as to select the second music piece corresponding to the first music piece to thereby ensure musical compatibility of the second music piece with the first music piece.

Preferably, the selecting means includes means operative when a multiple of second music pieces are selected in association with the first music piece for specifying one of the second music pieces to be exclusively performed jointly with the first music piece.

Preferably, the performing means performs the first music piece of a first karaoke song and jointly performs the second music piece of a second karaoke song. In such a case, the music apparatus further comprises display means for displaying lyric words of both the first karaoke song and the second karaoke song during the course of the joint performance of the first music piece and the second music piece.

BRIEF DESCRIPTION OF THE DRAWINGS

These and other objects of the invention will be seen by reference to the description, taken in connection with the accompanying drawings, in which:

FIG. 7(*b*) is a diagram illustrating an example of screen on which lyrics of two songs are displayed;

DETAILED DESCRIPTION OF PREFERRED EMBODIMENTS

This invention will be described in further detail by way of example with reference to the accompanying drawings.

1. First Preferred Embodiment

A: Constitution

The first preferred embodiment is applied to a karaoke apparatus that reads out song data from a storage device such as a hard disk drive, and reproduces a karaoke song or karaoke music piece from the read data. In addition to the normal or regular karaoke capability of performing one song specified or designated by a user, this embodiment has a joint karaoke capability of performing two or more songs in parallel or in series without interruption, which have been specified simultaneously or in succession. It should be noted that the following description of the first preferred embodiment is directed to an example in which two songs are performed in parallel; it will be apparent that the number of songs to be performed is not necessarily two.

Figure 1:
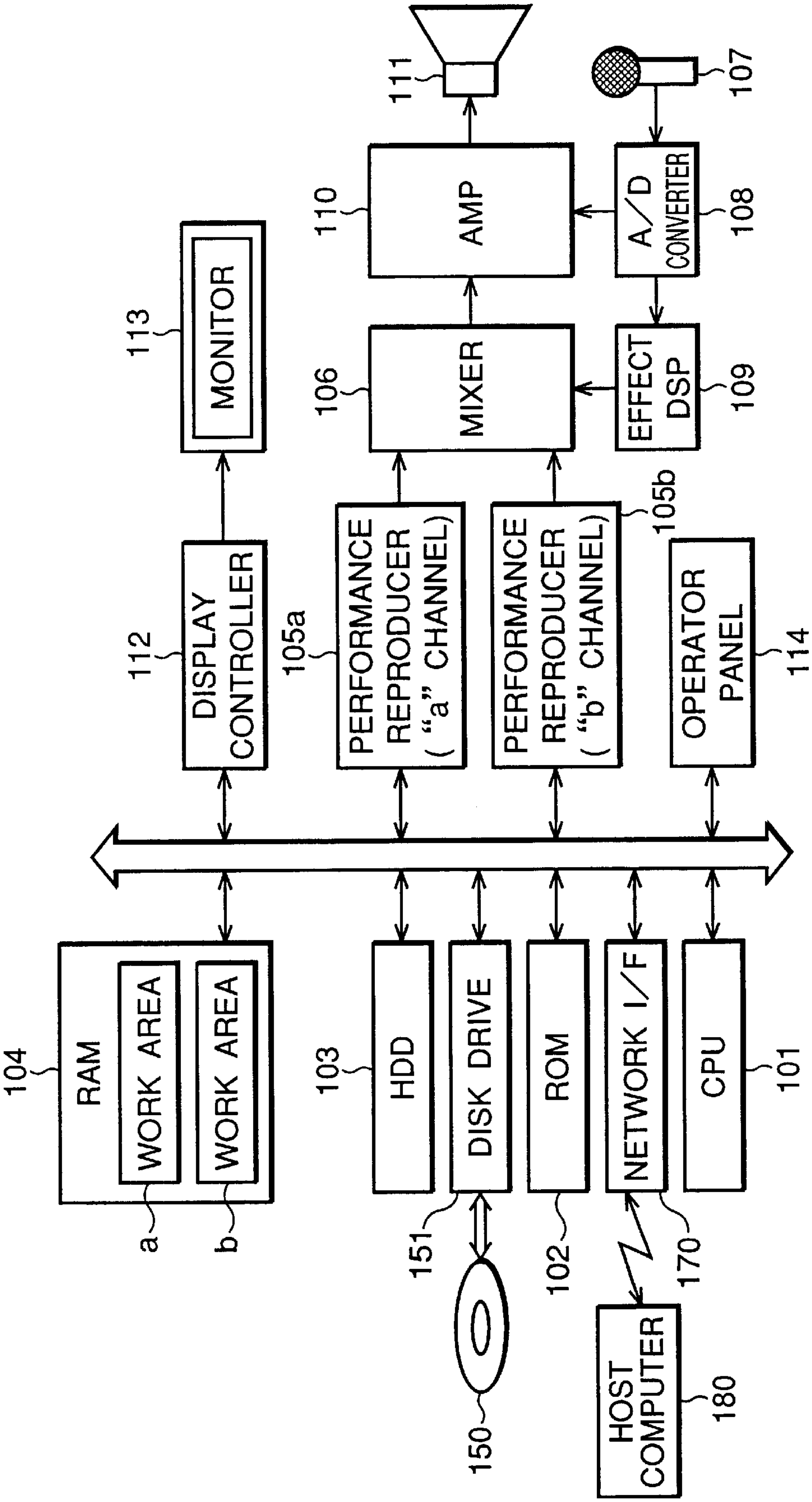
FIG. 1 is a block diagram illustrating a constitution of a karaoke apparatus practiced as one preferred embodiment of the invention.

Now, referring to FIG. 1, there is shown a block diagram illustrating a constitution of the karaoke apparatus practiced as the first preferred embodiment of the invention. In the figure, a CPU 101 is connected through a bus to a ROM 102, a hard disk drive (HDD) 103, a RAM 104, a performance reproducer ("a" channel) 105*a*, another performance reproducer ("b" channel) 105*b*, a display controller 112, and an operator panel 114. The CPU 101 controls this karaoke apparatus based on a control program stored in the ROM 102. The ROM 102 stores font data in addition to the control program.

The hard disk drive 103 stores song data for karaoke performance. The song data is stored in the hard disk drive 103 in advance. Alternatively, the song data may be supplied from a host computer 180 through a network interface 170 over a communication line, and may be accumulated in the hard disk drive 103. The RAM 104 contains a work area used for the karaoke performance. The work area is used to load the song data corresponding to a song to be performed. The song data is loaded from the hard disk drive 103. It should be noted that there are two work areas in the RAM 104; work area "a" and work area "b" for enabling parallel performance of two songs.

This karaoke apparatus has two channels of the performance reproducers; the "a" channel reproducer 105*a* and the "b" channel reproducer 105*b*. Each of the reproducers has a tone generator, a voice data processor, and an effect DSP. The tone generator forms a music tone signal based on MIDI data contained in the song data. The voice data processor forms a voice signal such as of backing vocal. The effect DSP imparts various effects such as echo and reverberation to the music tone signal and the voice signal, and outputs the effected signals as a karaoke performance signal. The performance reproducer ("a" channel) 105*a* and the performance reproducer ("b" channel) 105*b* form the performance signals based on the song data supplied under the control of the CPU 101, and outputs the formed signal to a mixer 106.

On the other hand, a singing voice signal inputted from a microphone 107 is converted by an A/D converter 108 into a digital signal. The digital signal is imparted with an effect such as echo, and is inputted in the mixer 106. The mixer 106 mixes the karaoke performance signals inputted from the performance reproducer ("a" channel) 105*a* and the performance reproducer ("b" channel) 105*b* with the singing voice signal inputted from an effect DSP 109 at an appropriate mixing ratio, then converts the mixed signal into an analog signal, and outputs the analog signal to an amplifier (AMP) 110. The amplifier 110 amplifies the inputted analog signal. The amplified analog signal is outputted from a loudspeaker 111.

The display controller 112 reads out display data from a predetermined work area in the RAM 104 to control display output on a monitor 113. The operator panel 114 is operated by the user to designate or request a karaoke song and to set various operation modes. The operator panel 114 has a numeric keypad and various key switches. A remote commander that operates on infrared radiation may be connected to the operator panel 114.

According to the invention, the karaoke music apparatus shown in FIG. 1 is constructed for performing a music piece based on song data. In the music apparatus, song storing means in the form of the hard disk drive 103 stores song data of a plurality of music pieces. Designating means is provided in the form of the operator panel 114 to designate a first music piece as an object of performance among the plurality of the music pieces stored in the song storing means. Selecting means is implemented by the CPU 101 to select from the plurality of the music pieces a second music piece having a part musically compatible with the first music piece. Processing means is also implemented by the CPU 101 to retrieve the song data of the first music piece and the song data of the second music piece from the song storing means, and processes the song data retrieved from the song storing means so as to mix the part of the second music piece into the first music piece. Performing means is provided in the form of the pair of the performance reproducers 105*a* and 105*b* and operates based on the processed song data for regularly performing the first music piece while mixing the part of the second music piece such that the second music piece is jointly performed in harmonious association with the first music piece.

The music apparatus further comprises reference storing means in the form of the hard disk drive 103 for storing reference data representative of a music property of the music pieces stored in the song storing means. In such a case, the selecting means comprises means for examining the reference data of the stored music pieces so as to select the second music piece having a music property harmonious with that of the first music piece to thereby ensure musical compatibility of the second music piece with the first music piece.

The song storing means is provided locally in the hard disk drive 103 together with the selecting means implemented by the CPU 101. On the other hand, the reference storing means may be provided in the host computer 180 remotely from the selecting means instead of the local hard disk drive 103. In such a case, the selecting means remotely accesses the reference storing means and locally accesses the song storing means to select therefrom the second music piece. The reference storing means stores the reference data representative of the music property in terms of at least one of a chord, a rhythm and a tempo of each music piece stored in the song storing means.

The selecting means includes analyzing means for analyzing a music property of the first music piece so as to select the second music piece having a music property harmonious with the analyzed music property of the first music piece to thereby ensure musical compatibility of the second music piece with the first music piece. Preferably, the analyzing means analyzes the music property of the first music piece in terms of at least one of a chord, a rhythm and a tempo. The selecting means includes means operative when a multiple of second music pieces are selected in association with the first music piece for specifying one of the second music pieces to be exclusively performed jointly with the first music piece.

The performing means performs the first music piece of a first karaoke song and jointly performs the second music piece of a second karaoke song. In such a case, the music apparatus further comprises display means in the form of the monitor 113 for displaying lyric words of both the first karaoke song and the second karaoke song during the course of the joint performance of the first music piece and the second music piece.

B: Operation (1) Overview

Figure 2:
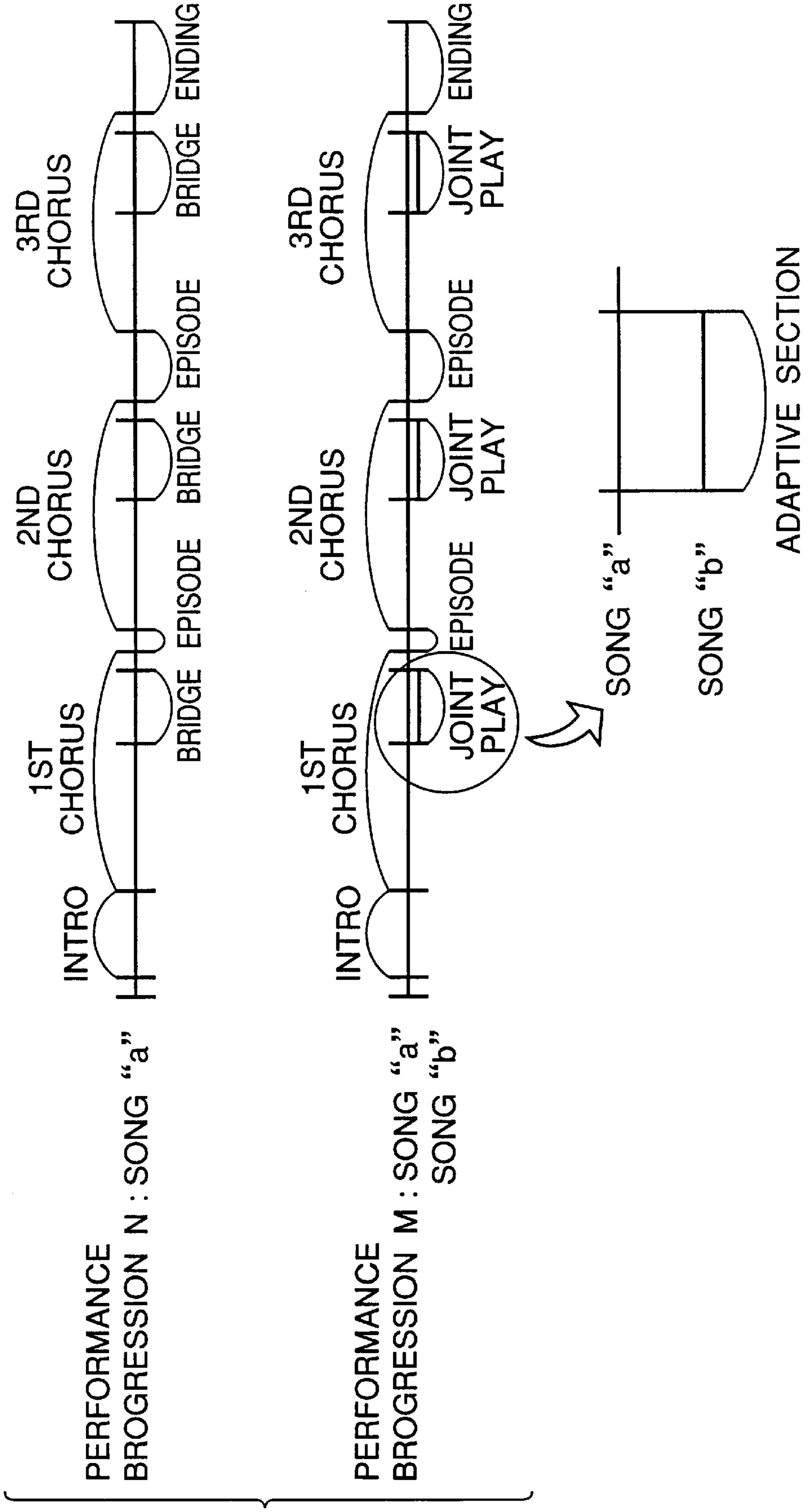
FIG. 2 is a diagram outlining performance modes in the karaoke apparatus associated with the invention.

The following describes operations of the karaoke apparatus having the above-mentioned constitution. FIG. 2 is a diagram outlining performance modes to be practiced on the present karaoke apparatus. In the figure, song flow N is indicative of regular karaoke play in which only song “a” is performed as with a normal case. On the other hand, in song flow M, there is a section overlapping two songs, in which the two songs are performed in parallel. The parallel performance of this section is hereafter referred to as a mix play or joint play. In the illustrated example, song “a” is designated as an object song to be mainly performed. The song “a” is a first music piece. On the other hand, the song “b” is automatically selected and performed in superimposed relation to the object song. The song “b” is therefore referred to as an auxiliary song or a second music piece. Practically, the auxiliary song is seldom superimposed in its entirety, only a part or section thereof being played in mix.

The section in the auxiliary song that can be superimposed on the object song is referred to as an adaptive section or compatible section. As described before, simultaneous performing of two songs having different music elements or properties such as chord, rhythm, and tempo results in a curious performance that sounds unnatural and confusing. To prevent this problem from happening, a compatible part in which the music elements of the two songs resemble each other is extracted as the adaptive section. In the first preferred embodiment, the user designates an object song as desired, and the karaoke apparatus automatically searches for other songs that have an adaptive section. Then, the user specifies an auxiliary song from the searched songs to perform the mix play or joint play.

(2) Format of Song Data

Figure 3:
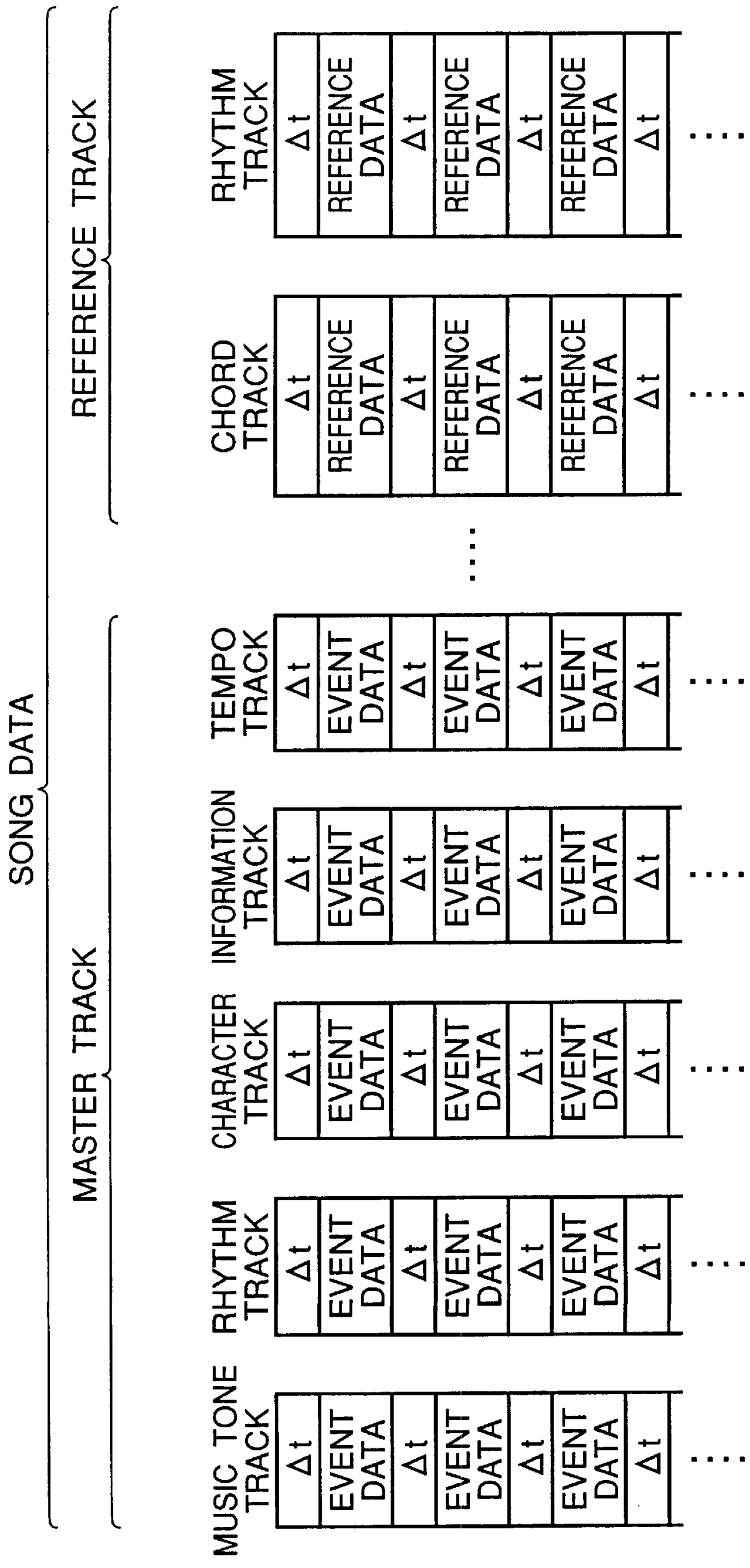
FIG. 3 is a diagram illustrating a structure of song data for use in a first preferred embodiment.

In order to enable automatic detection and selection of an adaptive section, the song data for karaoke performance in the present embodiment is formatted in a predetermined manner and is stored in that format. Each piece of song dada is assigned with a song number for identification of a music piece. FIG. 3 shows a format of song data for use in the first preferred embodiment. As shown, the song data is constituted by a master track and a reference track.

The master track is a track on which music event data for the normal karaoke performance is recorded. The master track is composed of plural sub tracks on which event data for indicating karaoke performance and lyrics display are recorded. These sub tracks include a music tone track on which MIDI data for indicating sounding and muting of a music note is recorded, a character track on which data for lyrics display is recorded, an information track on which information about intro, bridge, and so on is recorded, a voice track on which chorus voice and so on are recorded, a rhythm track on which rhythm data is recorded, a tempo track on which tempo data is recorded. On each of these sub tracks, delta time ($\Delta t$) and event data are recorded alternately. The event data is indicative of a status change of a music event, for example, a key-on or key-off operation. The delta time $\Delta t$ is indicative of a time between successive events.

On the other hand, the reference track is composed of plural sub tracks on which reference data for searching adaptive sections is recorded. In the present embodiment, these sub tracks include a chord track and a rhythm track. The chord track stores a sequence of chord names (such as C, F, and Am) to indicate a chord progression as the reference data. The rhythm track stores a rhythm pattern number for indicating a rhythm pattern as the other reference data. In the present embodiment, a rhythm pattern (namely, performance data for controlling rhythm performance) is formed in unit of several measures in advance. Each rhythm pattern is assigned with a rhythm pattern number (for example, R10, R11, and so on) for storage in the ROM 102. Not rhythm patterns but rhythm pattern numbers are written to the rhythm track, thereby significantly reducing the data quantity on the rhythm track. This holds true with the rhythm track in the above-mentioned master track. Thus, in the present invention, not rhythm patterns themselves but rhythm pattern numbers are written to the rhythm track in the reference track. This allows determination of adaptive sections by numeric rhythm pattern numbers. Consequently, the rhythm patterns themselves need not be compared and analyzed for determination of the adaptive section, thereby shortening the search time of the adaptive section.

(3) Song Select Operation

Figure 4:
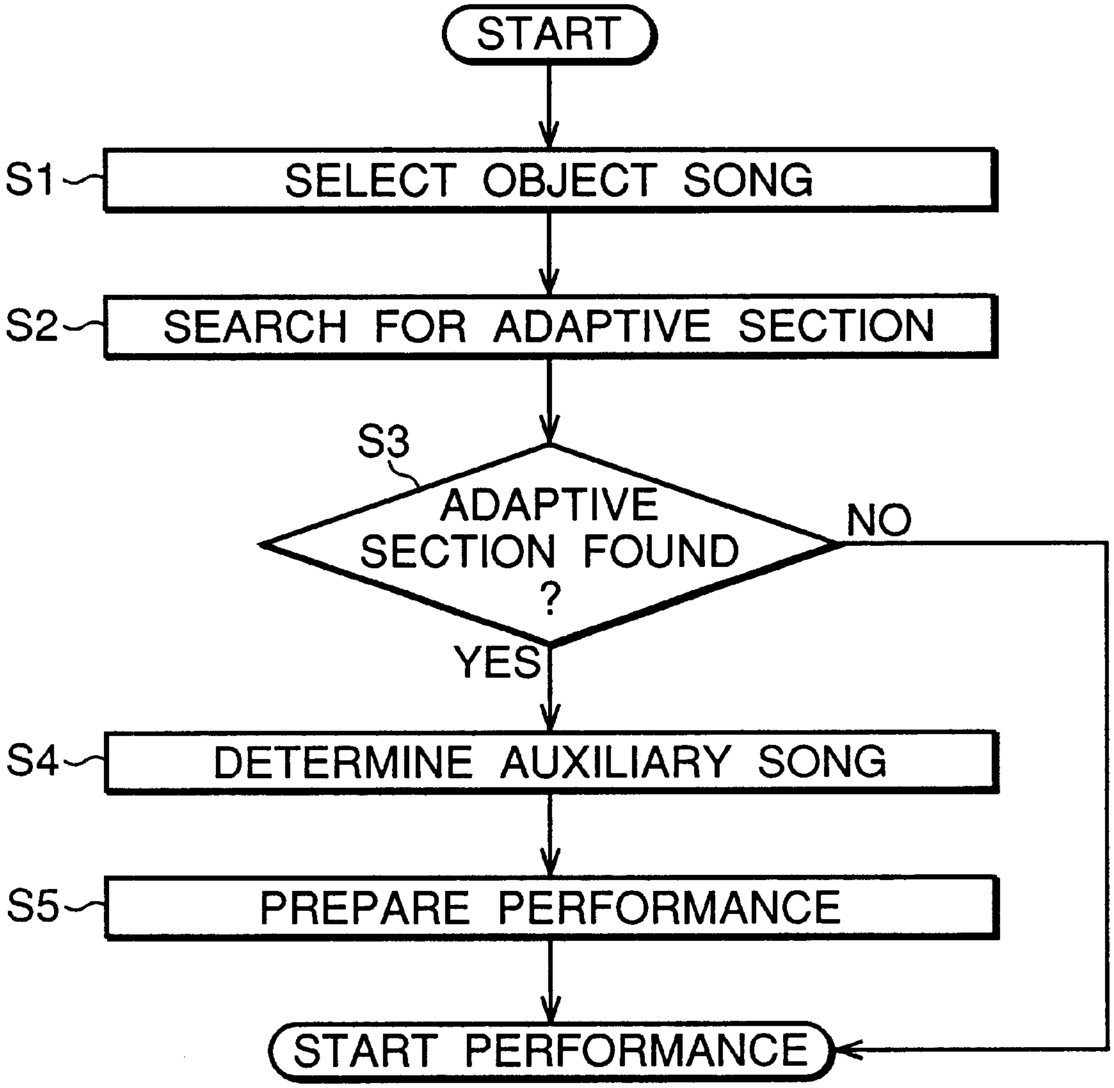
FIG. 4 is a flowchart indicative of a song selecting operation in the first preferred embodiment.

The following describes a song select operation with reference to a flowchart shown in FIG. 4 and the block diagram shown in FIG. 1. First, referring to the flowchart of FIG. 4, the user designates an object song by inputting a corresponding song number from the operator panel 114 in step S1. The song data of the designated object song is retrieved from the hard disk drive 103 and is loaded into the work area “a” of the RAM 104.

Next, the reference data of the designated object song is compared with the reference data of other songs stored in the hard disk drive 103 to search for a song having an adaptive section in step S2. The following describes a search operation of the adaptive section in detail. First, in order to select an auxiliary song that will not produce a sense of incongruity in the mix play or joint play, a song having compatible chord and rhythm is selected. For this purpose, the reference data shown in FIG. 3 is searched along chord tracks and rhythm tracks. Namely, the CPU 101 compares the data array of the chord track of the object song with the data array of the chord track of other song data a song by song basis. The data array denotes a data sequence composed of chord name, Δt, chord name, Δt, and so on recorded on the chord track. Likewise, the comparison of the rhythm track is executed. If a section is found in which the chord and rhythm arrays of the object song match even partially with the chord and rhythm arrays of a referenced song, the song number of the matching song and information about the matched section are stored in the work area "b" of the RAM 104. The matched section information is indicative of the matched section start and end positions in terms of the absolute time from the beginning of the song.

For a search condition, the rhythm does not always require a full match; an approximate match in a rhythm pattern is enough for determination of the rhythm matching. To search for an approximate rhythm pattern, the rhythm pattern number is constituted by a digit for matching determination and a digit indicative of a finer rhythm pattern. For the approximated rhythms, the numbers of the digits for use in search are kept the same. Alternatively, a table listing resembling rhythm patterns may be prepared. An approximate rhythm may be searched by referencing this table.

Figure 5:
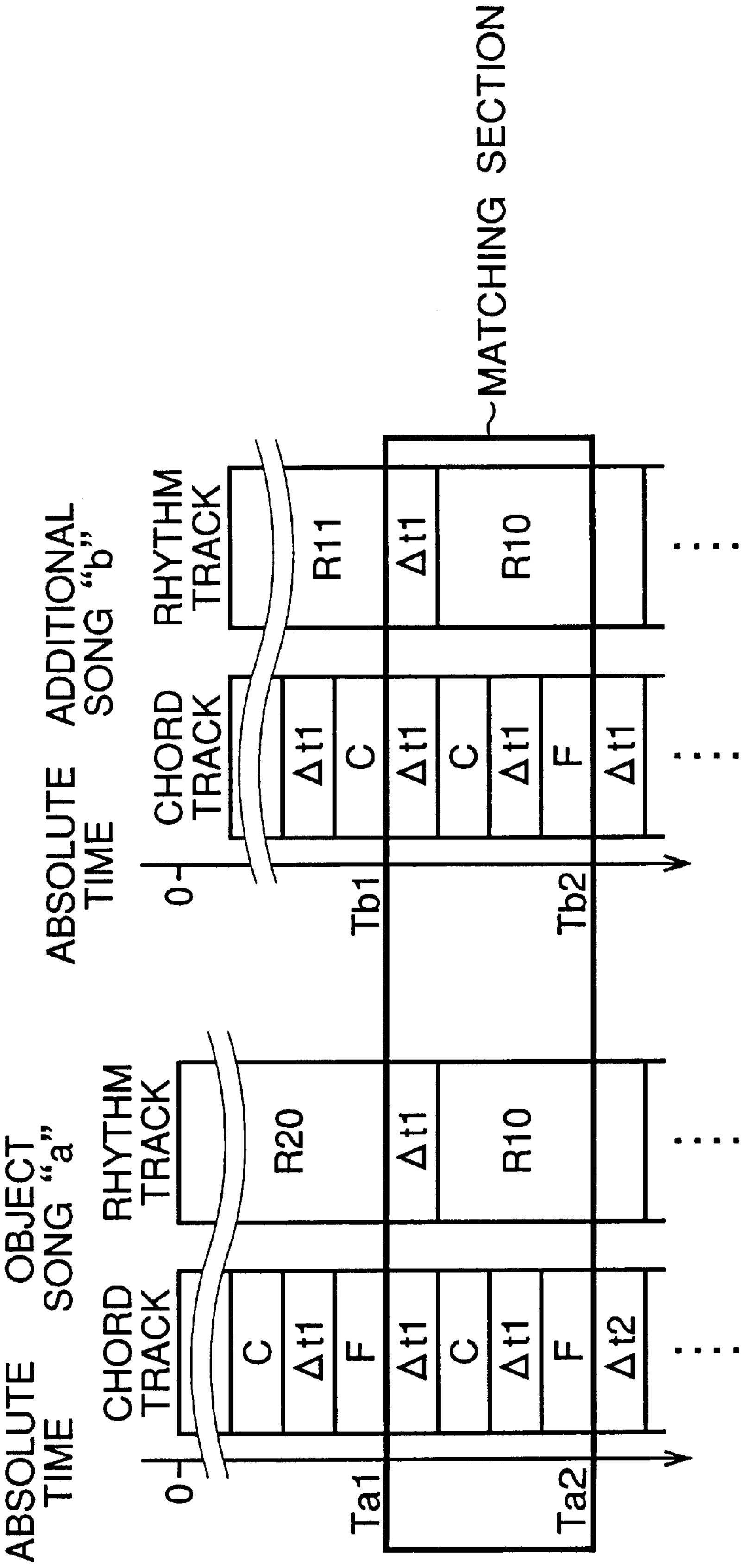
FIG. 5 is a diagram illustrating an example of an arrangement of music pieces in which chord and rhythm match each other.

FIG. 5 shows an example of data arrays having matched chords and rhythms. In this example, the chord and rhythm array between absolute times Ta1 and Ta2 from the beginning of the object song "a" matches the chord and rhythm array between absolute times Tb1 and Tb2 from the beginning of the song number "b." Therefore, the work area "b" of the RAM 104 stores the song number "b" and the section between Ta1 and Ta2 (information of the object song "a") and the section between Tb1 and Tb2 (information of the song "b" found matching) as matched section information.

When all songs stored on the hard disk drive 103 have all been searched in terms of the chord and rhythm, the data of the songs having an adaptive section is stored in the work area "b" of the RAM 104. It should be noted that, if a matched section is found across plural songs, the data about these plural songs are stored. If no matched section is found, this data does not exist.

Next, for all songs having the matched section thus obtained, the data of the master track is referenced. The information of the master track to be referenced includes tempo, key, vocal, bar, and beat. Thus, by referencing the master track, a song most suitable for the joint play is specified. For example, the present embodiment assumes a case in which two very resembling songs are sung in parallel. If a section such as intro or episode that is not sung is found as a matched section, the song having such a matched section need not be mixed for the joint play, and is therefore removed from the selection. Even if a chord match and a rhythm match are found, a song that has no matching tempo, beat, or bar, or has a key too apart from the key of the object song is also removed from the selection, because simultaneous or concurrent performing of such an auxiliary song and the object song causes a sense of incongruity. A song having a lyrics phrase that is interrupted halfway is not suitable for the karaoke play, and therefore is removed from the selection. The determination whether or not the selected songs are suitable as an auxiliary song is made by referencing the master track. It should be noted that tempo need not be matched in its entirety; tempo may be recorded with a certain allowable width or margin.

For the songs found inappropriate for the mix play as a result of the master data analysis, their song numbers are cleared from the work area "b" of the RAM 104. Thus, the song data suitable for the mix play is narrowed down to obtain the song data having an optimum adaptive section.

Now, referring to the flowchart of FIG. 4 again, if no song having an adaptive section is found in step S3, the object song is performed as a normal karaoke play. On the other hand, if two or more songs having adaptive sections are found, one of these songs is specified as an auxiliary song in step S4. This selection may be made by the karaoke apparatus or by the user. The selection by the karaoke apparatus may be implemented by providing criteria that a song having the lowest song number is selected or a song having the highest matching degree is selected. An evaluation system for determining the criteria may be provided in advance. If the selection is made by the user, a list of songs having adaptive sections may be displayed on the monitor 113, from which a desired song number is selected manually by the user.

In step S5 shown in FIG. 4, preparations are made for the mix play. The preparations include determination of a mode of the mix play and setting of the mix play section. The following describes the method of the mix play.

1) Two songs are performed in parallel without change. However, it is a general practice to take following measures because few songs match each other completely.

2) Adjustment for Rhythm (a) As for rhythm, not only a song having completely matched rhythm but also a song having an approximately matched rhythm is the target of search. Therefore, if rhythm play of an object song and an auxiliary song having an approximately matching rhythm are simply performed in parallel, a portion in which no accord is found may be caused. To prevent this rhythm discrepancy from happening, the mix play is performed with only one of the rhythms of the object song and the auxiliary song.

(b) Alternatively, two rhythm parts may be integrated to each other. For the rhythm synthesis, a method using a neural net is known. This method may be used for the rhythm synthesis. In this case, a synthesized rhythm must be formed beforehand in the stage of the karaoke performance preparations.

(c) Alternatively still, only the rhythm part of one of the two songs may be left, stopping the other rhythm performance.

The mode of the rhythm adjustment to be used is determined by displaying a list of these measures and by selecting desired measures on the operator panel 114. Alternatively, one of the above-mentioned measures may be selected as a default measure to be practiced by the karaoke apparatus; only the other measures are left for user's selection. Alternatively still, an algorithm for determining the degree of adaptivity of the measures may be programmed and stored in the ROM 102. The CPU 101 determines the degree of the adaptivity based on this program.

3) Selection Associated with Tempo

Tempo selection is also made with some margin, so that one of the following measures must be taken:

(a) Performance is made with one of the tempos of the object song and the auxiliary song.

(b) Gradual change is made from the tempo of the object song to the tempo of the auxiliary song.

(c) Tempo is changed by a particular algorithm having a transitional pattern. The transitional pattern may be selected by the user, or randomly set by the karaoke apparatus.

The CPU 101 executes data processing corresponding to the selected measure on each data of the master track of the object song and each data of the master track of the auxiliary song, and sends the resultant data to the performance reproducer ("a" channel) 105*a* and the performance reproducer ("b" channel) 105*b*. At this moment, the data not to be performed is masked or replaced with synthetic data. For example, when the mix play is made with the rhythm of the object song, the data of the rhythm track of the auxiliary song is masked. If the rhythm is synthesized, the synthetic rhythm data replaces the data of the rhythm track of the auxiliary song, while the data of the rhythm track in the mix play section of the object song is masked.

The following describes setting of a mix play section. The mix play section is set by writing the mix play start and end information indicative of the mix play section onto the information tracks of the object song "a" and the auxiliary song "b" in the RAM 104. Namely, a mix play start marker is written to an information track position providing the same absolute time as that of the position at which the first match in the chord and rhythm data arrays is found. Likewise, a mix play end marker is written to the last position at which the match in the arrays is found. When the above-mentioned processing has been completed, the performance of the object song starts.

(4) Reproducing Operation

Figure 6:
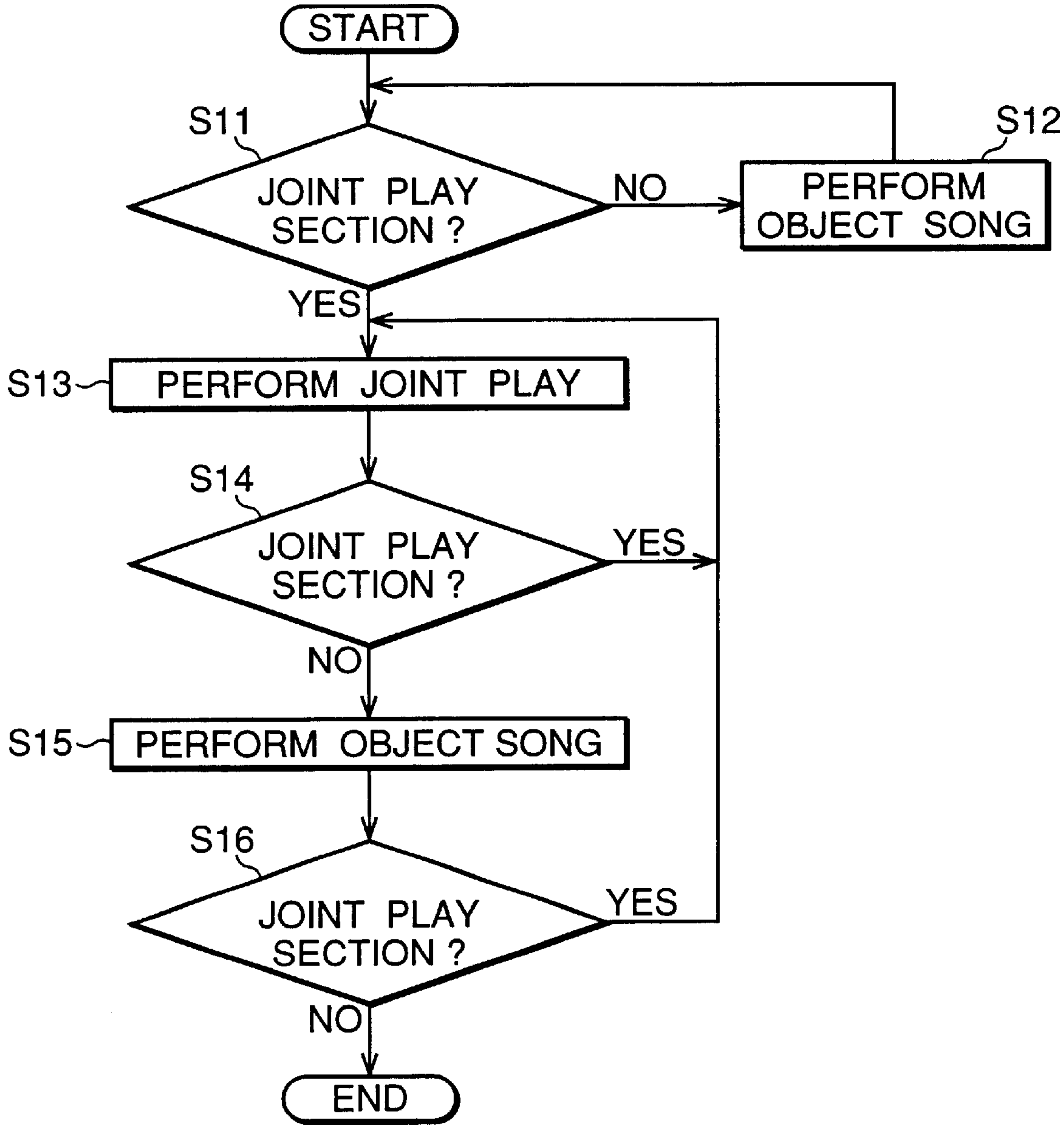
FIG. 6 is a flowchart indicative of an operation at joint performance.

The following describes the operations to be executed at the karaoke performance with reference to a flowchart shown in FIG. 6 and the block diagram shown in FIG. 1. It should be noted that the selected object song and the auxiliary song are denoted by the song "a" and the song "b", respectively, shown in FIG. 2, and the mix play is performed at the bridge part in each chorus.

First, under the control of the CPU 101 according to the sequence program stored in the ROM 102, the performance reproducer ("a" channel) 105*a* sequentially reads the master track data of the song "a" loaded in the work area "a" of the RAM 104. Next, the marker written to the information track is detected in step S11. It should be noted that the data reading and reproducing operations of the performance reproducer ("a" channel) 105*a* and the performance reproducer ("b" channel) 105*b* are controlled in their execution timings by use of a system clock, not shown. This system clock provides the absolute time from the start of the karaoke performance, and counts $\Delta t$ of each track.

If no mix play section start marker is written in the retrieved information track, only the object song "a" is performed in step S12. Namely, the performance reproducer ("a" channel) 105*a* forms a music tone signal and a voice signal based on each event data, and sends these signals to the mixer 106. Subsequently, the operations of steps S11 and S12 are repeated until the mix play section start marker is detected, thereby continuing the regular performance of the object song "a."

If the mix play section start marker is detected, then the mix play is commenced in step S13. Namely, the performance reproducer ("a" channel) 105*a* continuously reads the data of the song "a" and, at the same time, the performance reproducer ("b" channel) 105*b* reads the data of the auxiliary song "b" from the position pointed by the mix play section start marker. In this case, the data of the object song "a" and the data of the auxiliary song "b" read at the same time provide concurrent music events.

The data to be outputted to the mixer 106 is masked or rewritten for a part of the data of the original song according to the selection of the above-mentioned mix play methods. Namely, the performance reproducer ("a" channel) 105*a* and the performance reproducer ("b" channel) 105*b* form a music tone signal and a voice signal, respectively, and send these signals to the mixer 106. At this moment, the data not to be performed is not read and the data to be changed is rewritten, thereby realizing the desired mix play.

Then, the performance reproducer ("a" channel) 105*a* sequentially reads the data to check the information track for the mix play section end marker in step S14. If no mix play section end marker is detected, then back in step S13, the operations of steps S13 and S14 are repeated. This allows the mix play by the performance reproducer ("a" channel) 105*a* and the performance reproducer ("b" channel) 105*b* to be continued. On the other hand, if the mix play section end marker is detected, the performance reproducer ("b" channel) 105*b* ends the data reading, while the performance reproducer ("a" channel) 105*a* continues the data reading and reproduction in step S15. Namely, the mix play section ends, and the karaoke apparatus returns to the regular state in which only the object song is performed.

If the performance reproducer ("a" channel) 105*a* detects a mix play section start marker again in step S16, then back in step S13, the mix play is performed again. The above-mentioned processing is repeated until the last data of the object song "a" is read. Thus, by control of the absolute time by use of the system clock, the data read and reproduction processing is executed for the mix play section by the performance reproducers of two channels at the same time, thereby realizing the mix play.

(5) Lyrics Display

Meanwhile, the karaoke apparatus displays characters on the monitor to guide the user along the lyrics of a song in synchronization with the music performance. In a mix play section, the lyrics for the two songs must be displayed. Therefore, in the present embodiment, the screen on the monitor is divided into an upper zone and a lower zone, in which the lyrics of the two songs are displayed separately. The following describes how this lyrics display processing is controlled.

Figure 7A:
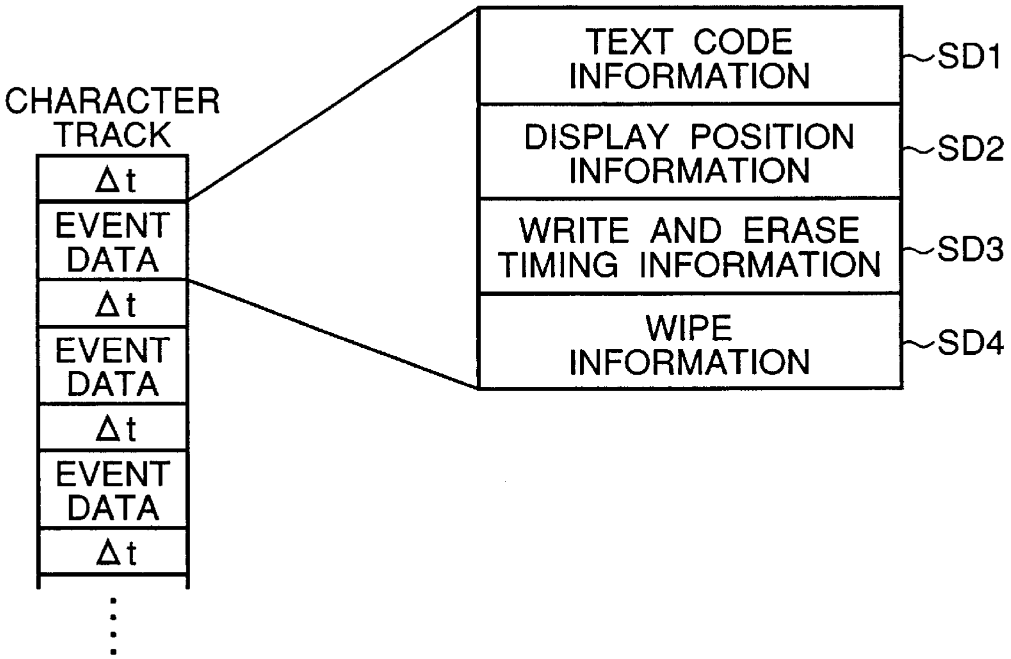
FIG. 7(*a*) is a diagram illustrating a structure of character display data.
Figure 7B:
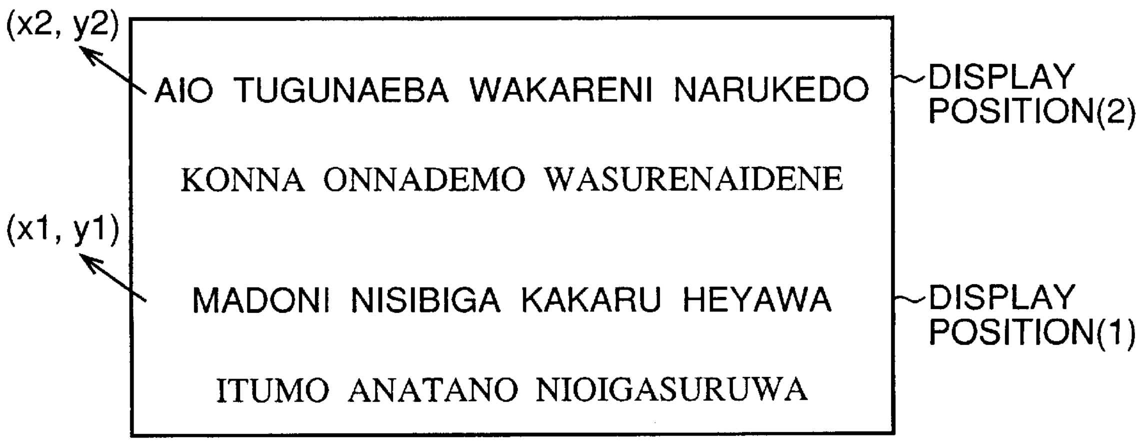

FIGS. 7(*a*) shows a structure of character display data, and 7(*b*) shows an example of a screen in which two songs of lyrics are displayed. First, the data for displaying characters will be described. As shown in FIG. 7(*a*), the character display data recorded on the character track is composed of text code information SD1, display position information SD2, write and erase timing information SD3, and wipe information SD4. In this case, the display position information SD2 is indicative of a position at which a character string indicated by the text code information SD1 is displayed.

For example, this information is represented by X-Y coordinate data indicative of the position of the origin of a character string such as the upper left point of a first character. For this coordinate data, the display position in the case only one song is performed is recorded. In this example, coordinates (x1, y1) are recorded. The write and erase timing information SD3 is clock data indicative of the display start and end timings for a character string or a phrase indicated by the text code information SD1. The wipe information SD4 is used for controlling a character color change operation as the song progresses. This information is composed of a color change timing and a color change speed.

The following describes the display control operation. The CPU 101 sequentially outputs the data of the character tracks of the song "a" and the song "b" to the display controller 112. Based on the text code information SD1, the display controller 112 reads font data from the ROM 102 to convert the text code into bitmap data for displaying the lyrics. Then, based on the display position information SD2, the write and erase timing information SD3, and the wipe information SD4, the display controller 112 displays the bitmap data on the monitor 113 at a predetermined display position.

The CPU 101 controls the display controller 112 such that the lyrics of only the object song "a" are displayed until the mix play section starts. Namely, if only one song is displayed, the lyrics are located at display position (1) shown in FIG. 7(*b*), specified by the coordinates (xl, yl) as recorded in the display position information SD2 in the character display data.

When the performance progresses and the mix play section starts, the CPU 101 starts controlling the display controller 112 such that the lyrics of the two songs are displayed in parallel. At this moment, the display controller 112 determines display coordinates such that the lyrics of the object song "a" are displayed on the upper lines indicated by the display position (2) shown in FIG. 7(*b*), and the lyrics of the auxiliary song "b" are displayed on the lower lines indicated by the display position (1) shown in FIG. 7(*b*). Namely, for the auxiliary song "b," coordinates (x1, y1) provides the origin of the lyrics display as indicated by the coordinate data. The coordinate data (x1, y1) of the object song "a" is modified such that a point (x2, y2) corresponding to the display position (2) (the upper lines) provides the origin of the lyrics display.

When the mix play section ends, the CPU 101 stops reading of the character display data of the auxiliary song "b." Subsequently, the lyrics of only the object song "a" are displayed. The display position at this time is defined by the display position information SD2 (refer to FIG. 7(*a*)), namely the display position (1) shown in FIG. 7(*b*). It should be noted that the lyrics display method is not restricted to that described above. For example, the lyrics of the object song may be displayed on the lower lines; the display screen may be divided into a right-hand zone and a left-hand zone, in which the lyrics of both songs are displayed separately; the lyrics of the two songs may be displayed alternately on each other line; a system constitution having two display screens may be provided; or the lyrics of the two songs may be distinguished by color or font.

As described and according to the first preferred embodiment, when the user designates a desired song or an object song, another song having an adaptive section in which the mix play with the object song is enabled is automatically designated as an auxiliary song. In the adaptive section, the lyrics of both the object song and the auxiliary song are displayed. Namely, the inventive method of jointly playing music pieces by processing song data is conducted by the steps of provisionally storing song data representing a plurality of music pieces, designating a first music piece as an object of the joint play among the plurality of the music pieces, automatically selecting a second music piece from the plurality of the music pieces as another object of the joint play such that the second music piece has a musical compatibility with the first music piece, processing the song data of the first music piece and the song data of the second music piece so as to merge the second music piece to the first music piece, and jointly playing the first music piece and the second music piece based on the processed song data such that the second music piece is reproduced in harmonious association with the first music piece due to the musical compatibility of the second music piece with the first music piece.

The inventive method further comprises the step of provisionally storing reference data representative of a music property of the stored music pieces. In such a case, the step of automatically selecting examines the reference data of each of the stored music pieces so as to select the second music piece having a music property harmonious with that of the first music piece to thereby ensure the musical compatibility of the second music piece with the first music piece. The step of automatically selecting analyzes a music property of the first music piece so as to select the second music piece having a music property harmonious with the analyzed music property of the first music piece to thereby ensure the musical compatibility of the second music piece with the first music piece.

2: Second Preferred Embodiment

The following describes a karaoke apparatus practiced as a second preferred embodiment of the invention. In the second preferred embodiment, adaptive sections between songs are related with each other by table data stored in advance.

A: Constitution

The hardware constitution of the second preferred embodiment is generally the same as that of the first preferred embodiment. Namely, as shown in FIG. 1, the inventive music apparatus is constructed for joint play of music pieces by processing song data. In the music apparatus, a storage device composed of the hard disk drive 103 stores song data representing a plurality of music pieces. An operating device composed of the operator panel 114 operates for designating a first music piece as an object of the joint play among the plurality of the music pieces stored in the storage device. A controller device composed of the CPU 101 automatically selects a second music piece from the plurality of the music pieces as another object of the joint play such that the second music piece has a musical compatibility with the first music piece. A processor device composed also of the CPU 101 retrieves the song data of the first music piece and the song data of the second music piece from the storage device, and processes the song data retrieved from the storage device so as to merge the second music piece to the first music piece. A sound source composed of the performance reproducers 105*a* and 105*b* operates based on the processed song data for jointly playing the first music piece and the second music piece such that the second music piece is reproduced in harmonious association with the first music piece due to the musical compatibility of the second music piece with the first music piece. Characterizingly, the inventive music apparatus further comprises an additional storage device composed of the hard disk drive 103 that stores table data for provisionally recording a correspondence between each music piece stored in the storage device and other music piece stored in the storage device such that the recorded correspondence indicates the musical compatibility of the music pieces with each other. In such a case, the controller device searches the table data so as to select the second music piece corresponding to the first music piece to thereby ensure the musical compatibility of the second music piece with the first music piece.

Figure 8:
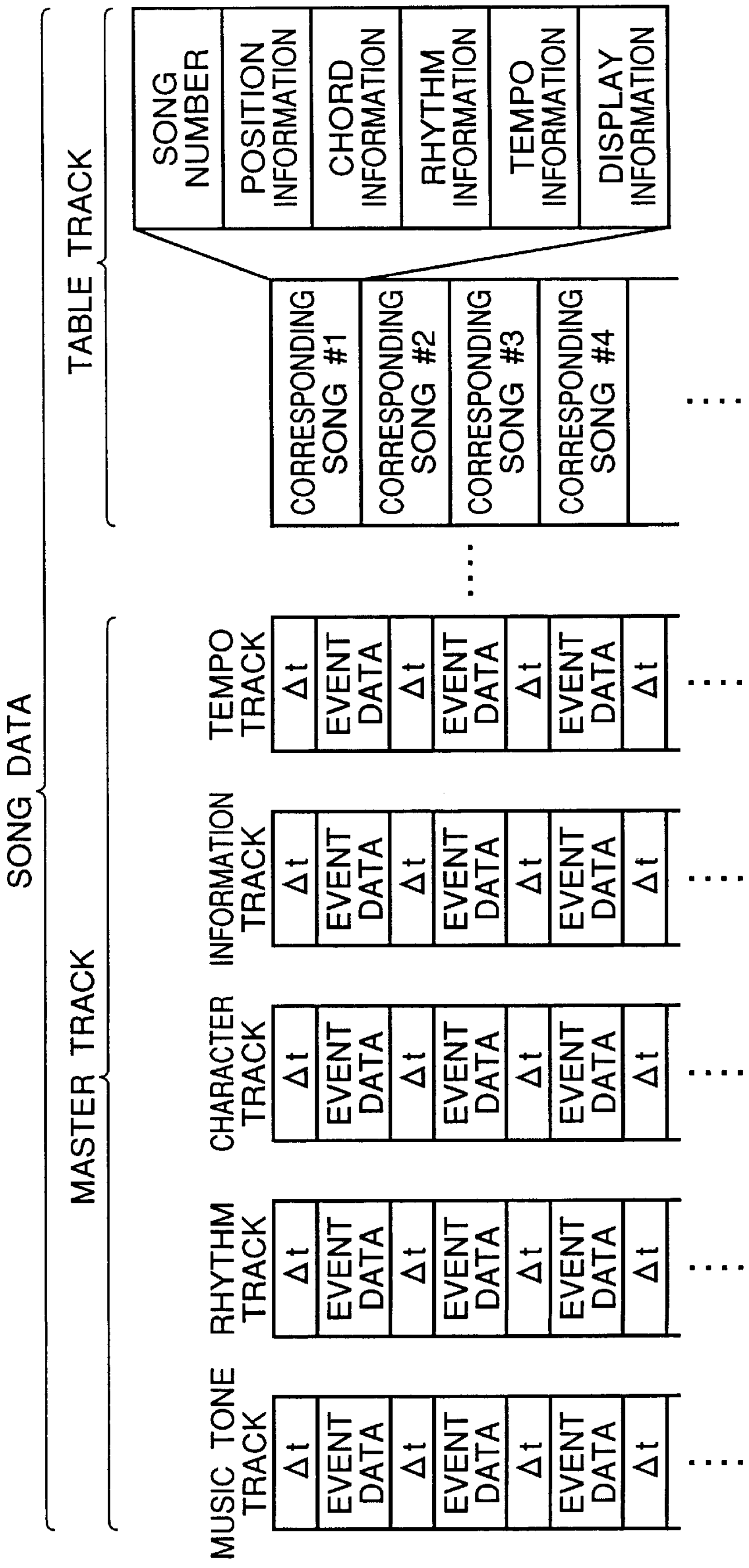
FIG. 8 is a diagram illustrating a structure of song data for use in the karaoke apparatus practiced as a second preferred embodiment of the invention.

The song data structure of the second embodiment differs from that of the first embodiment. The following describes the song data structure of the second preferred embodiment. FIG. 8 shows the song data structure for use in the second preferred embodiment. As shown, the song data of the second preferred embodiment has no reference track found in the first preferred embodiment. Instead, the song data of the second preferred embodiment is composed of a master track and a table track. The master track is generally the same in structure as that of the first preferred embodiment. The table track stores various information about auxiliary songs having adaptive sections in association with an object song along with the song numbers of these auxiliary songs. The table track also stores information about an adaptive section; namely auxiliary song start and end positions and object song start and end positions. Further, if tempos or rhythms of an object song and an auxiliary song are to be adjusted for a mix play or lyrics display has a particular specification, the prepared table information about these requirements may be stored in advance. It should be noted that all information including song data that are reproducible for performance may be stored in the table track as performance information. In this case, no auxiliary song need be read separately. Further, these data may be already subjected to the necessary synthesis. For example, the data is provisionally adjusted for rhythm. In this case, the joint performance can be made by only one channel of the performance reproducer.

B: Operation

Figure 9:
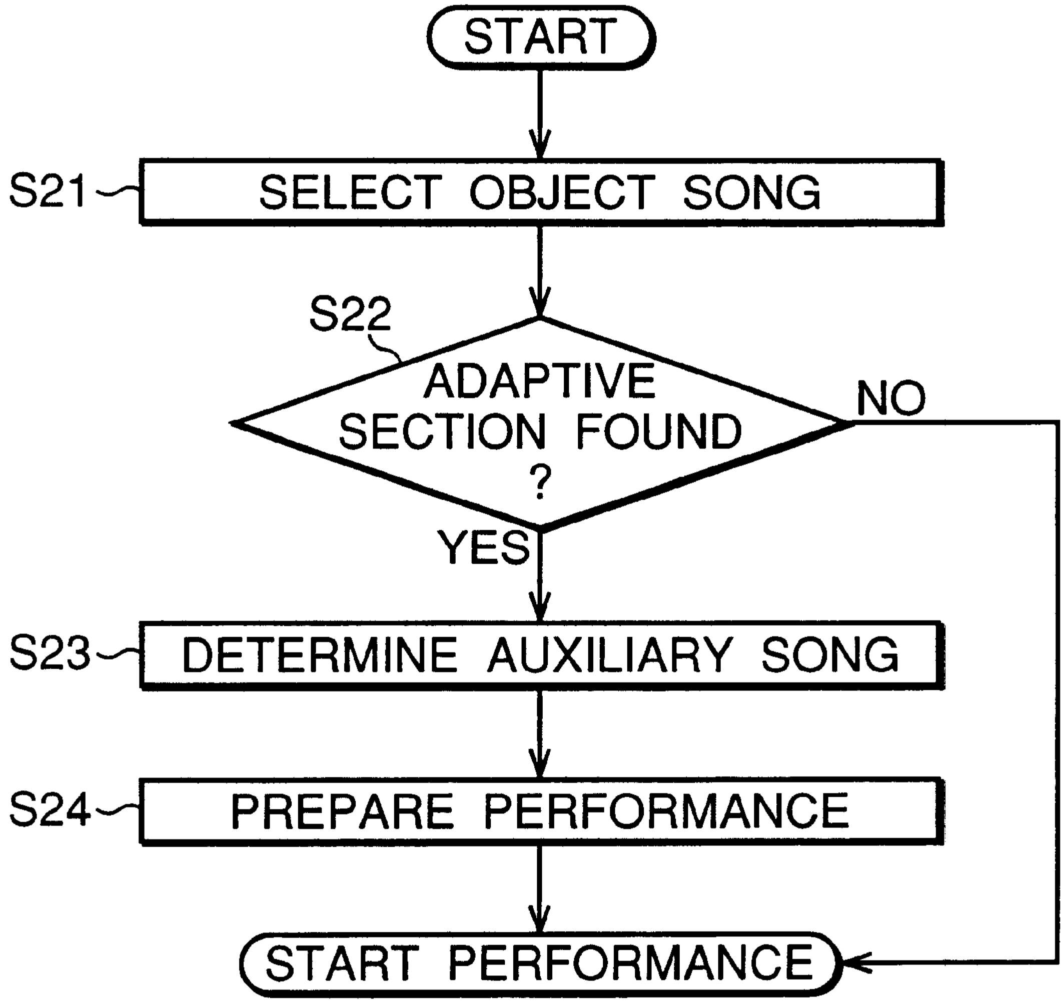
FIG. 9 is a flowchart indicative of an operation of the second preferred embodiment.

The following describes the operation of the second preferred embodiment. FIG. 9 shows a flowchart indicative of this operation. First, the user designates an object song in step S21. The designated object song is loaded into the work area "a" of the RAM 104. Next, the CPU 101 references the table track of the object song in step S22. If no song having an adaptive section is found, the karaoke performance of the object song starts alone. If a song having an adaptive section is found, one auxiliary song is selected from the stored songs in step S23. The determination of this selection may be made by the user or the karaoke apparatus as with the first preferred embodiment. When the auxiliary song is determined, the auxiliary song is transferred in step S24 from the hard disk drive 103 to the work area "b" in the RAM 104 to make preparations for the joint performance. Subsequently, the same performance processing as that of the first preferred embodiment follows. Thus, in the second preferred embodiment, the adaptive section data is stored in advance as the table data or cross-reference data, so that the auxiliary song can be readily specified in a short time for the mix play.

3: Variations

It should be noted that the present invention is not restricted to the above-mentioned embodiments. Following variations for example are expedient.

(1) Variation to Construction

In the above-mentioned embodiments, two channels of performance reproducers are provided, each having a tone generator. In some cases, the similar operation can be provided by a tone generator of one channel. Three or more channels of performances may be mixed by increasing the clock rate for time division operation of the multiple channels. Three or more performance reproducers may be provided to mix songs in the corresponding number. In the above-mentioned embodiments, the program for controlling the music apparatus is incorporated therein. Alternatively, this program may be stored in a machine readable medium 150 such as a floppy disk and supplied to a disk drive 151 of the apparatus (FIG. 1). Namely, the machine readable medium 150 is for use in the music apparatus having the CPU 101 for jointly playing music pieces by processing song data. The medium 101 contains program instructions executable by the CPU 101 for causing the music apparatus to perform the method comprising the steps of providing song data representing a plurality of music pieces, designating a first music piece as an object of the joint play among the plurality of the music pieces, automatically selecting a second music piece from the plurality of the music pieces as another object of the joint play such that the second music piece has a musical compatibility with the first music piece, processing the song data of the first music piece and the song data of the second music piece so as to merge the second music piece to the first music piece, and jointly playing the first music piece and the second music piece based on the processed song data such that the second music piece is reproduced in harmonious association with the first music piece due to the musical compatibility of the second music piece with the first music piece.

(2) Variation to Data

The song data may have both the reference track and the table track.

In addition, a learning capability may be provided by additionally recording the data searched by the CPU described with reference to the first preferred embodiment to the data of the table track. An adaptive section database may be prepared by storing the song numbers of songs having adaptive sections and storing these adaptive sections. In this case, by providing search means similar to those used in the above-mentioned embodiments, newly searched adaptive section data may be added to the data of the table track. In the above-mentioned embodiments, the song data are all stored in the local apparatus. Alternatively, The data of the reference track and the table track stored on an external or remote storage device may be searched through the network interface 170.

In the above-mentioned embodiments, the reference data and the song data are stored integrally. These data may be stored separately and the relationship between them may be provided by song numbers. For example, in an online karaoke system, only the reference data may be stored in the apparatus, while the data of songs having adaptive sections are supplied from the host computer 180. This arrangement reduces the size of the database provided in each karaoke terminal. In this case, the data supplied by communication precludes reference data, resulting in an increased data distribution processing speed. In the above-mentioned embodiments, the data are used for karaoke performance. The data may also be used for another form of music performance.

(3) Variation to Search

In the above-mentioned embodiments, the chord information is represented in chord. Alternatively, a set of note information (for example, C3, E3, and G3) constituting a chord may be stored as chord information. This arrangement allows not only full search but also fuzzy search (partially matched search).

In the first preferred embodiment, search is executed by providing the reference track. Alternatively, search may be made by extracting chords and rhythms from each data recorded on the master track. Tempo information may also be stored as data to be searched for. The determination of adaptive elements is not restricted to that used in the above-mentioned embodiments. In the above-mentioned embodiments, only a singing sections is selected for the determination. For example, a section of only a song may be selected. Alternatively, a case in which the ending of a song matches the intro of the following song may be searched to form a medley.

Further, information such as singer names and song genres may be stored on the reference track or the master track to be specified as a search condition. Search information may be stored for the section of an entire song or a part thereof. The object of search may be only a release part for example.

(4) Variation to Reproduction

In the above-mentioned embodiments, when the mix play section ends, the karaoke performance returns to only the object song. Alternatively, the karaoke performance may return to only the auxiliary song. In this case, the auxiliary song may be performed with the tempo and rhythm of the object song. In the first preferred embodiment, the two songs are mixed at the time of performance. Alternatively, the two songs may be mixed in the preparation stage of performance to form one piece of data. In this case, the user may make various settings and corrections on this data as required. Only lyrics of two songs may be displayed without performing a mix play. In the above-mentioned embodiments, the joint performance is conducted in the mix play section. Alternatively, only the auxiliary song may be performed in the mix play section, followed by a solo performance of the auxiliary song, thereby providing a medley of the two songs. In this case, the songs matching in chord or rhythm are coupled to each other, resulting in a smooth connection. Therefore, this variation does not require processing such as bridging for smoothly connecting the songs.

As described and according to the invention, a song having an adaptive section allowing a mix play with another song specified by the user can be searched for, thereby realizing a mix play of two or more songs.

While the preferred embodiments of the present invention have been described using specific terms, such description is for illustrative purposes only, and it is to be understood that changes and variations may be made without departing from the spirit or scope of the appended claims.

What is claimed is:

1. A music apparatus for performing a music piece based on song data, comprising:

song storing means for storing song data of a plurality of music pieces;

designating means for designating a first music piece as an object of performance among the plurality of the music pieces stored in the song storing means;

selecting means for selecting from the plurality of the music pieces at least a second music piece being different from the first music piece and having a part musically compatible with the first music piece;

processing means for retrieving the song data of the first music piece and the song data of the second music piece from the song storing means, and for processing the song data retrieved from the song storing means so as to mix the part of the second music piece into the first music piece; and performing means operative based on the processed song data for regularly performing the first music piece while mixing the part of the second music piece such that the second music piece is jointly performed in harmonious association with the first music piece.

2. The music apparatus according to claim 1, further comprising reference storing means for storing reference data representative of a music property of the music pieces stored in the song storing means, and wherein the selecting means comprises means for examining the reference data of the stored music pieces so as to select the second music piece having a music property harmonious with that of the first music piece to thereby ensure musical compatibility of the second music piece with the first music piece.

3. The music apparatus according to claim 2, wherein the song storing means is provided locally together with the selecting means, wherein the reference storing means is provided remotely from the selecting means, and wherein the selecting means remotely accesses the reference storing means and locally accesses the song storing means to select therefrom the second music piece.

4. The music apparatus according to claim 2, wherein the reference storing means stores the reference data representative of the music property in terms of at least one of a chord, a rhythm and a tempo of each music piece stored in the song storing means.

5. The music apparatus according to claim 1, wherein the selecting means includes analyzing means for analyzing a music property of the first music piece so as to select the second music piece having a music property harmonious with the analyzed music property of the first music piece to thereby ensure musical compatibility of the second music piece with the first music piece.

6. The music apparatus according to claim 5, wherein the analyzing means analyzes the music property of the first music piece in terms of at least one of a chord, a rhythm and a tempo.

7. The music apparatus according to claim 1, further comprising table storing means for storing table data that records correspondence between each music piece stored in the song storing means and other music piece stored in the song storing means such that the recorded correspondence indicates musical compatibility of the music pieces with each other, and wherein the selecting means comprises means for referencing the table data so as to select the second music piece corresponding to the first music piece to thereby ensure musical compatibility of the second music piece with the first music piece.

8. The music apparatus according to claim 1, wherein the selecting means includes means operative when a multiple of second music pieces are selected in association with the first music piece for specifying one of the second music pieces to be exclusively performed jointly with the first music piece.

9. The music apparatus according to claim 1, wherein the performing means performs the first music piece of a first karaoke song and jointly performs the second music piece of a second karaoke song, and wherein the music apparatus further comprises display means for displaying lyric words of both the first karaoke song and the second karaoke song during the course of the joint performance of the first music piece and the second music piece.

10. A music apparatus for joint play of music pieces by processing song data, comprising:

a storage device that stores song data representing a plurality of music pieces;

an operating device that operates for designating a first music piece an object of joint play among the plurality of the music pieces stored in the storage device;

a controller device that automatically selects at least a second music piece, being different from the first music piece, from the plurality of the music pieces as another object of the joint play such that the second music piece has a musical compatibility with the first music piece;

a processor device that retrieves the song data of the first music piece and the song data of the second music piece from the storage device, and that processes the song data retrieved from the storage device so as to merge the second music piece to the first music piece; and a sound source that operates based on the processed song data for jointly playing the first music piece and the second music piece such that the second music piece is reproduced in harmonious association with the first music piece due to the musical compatibility of the second music piece with the first music piece.

11. The music apparatus according to claim 10, further comprising an additional storage device that stores reference data representative of a music property of the music pieces stored in the storage device, and wherein the controller device examines the reference data of each of the stored music pieces so as to select the second music piece having a music property harmonious with that of the first music piece to thereby ensure the musical compatibility of the second music piece with the first music piece.

12. The music apparatus according to claim 10, wherein the controller device analyzes a music property of the first music piece so as to select the second music piece having a music property harmonious with the analyzed music property of the first music piece to thereby ensure the musical compatibility of the second music piece with the first music piece.

13. The music apparatus according to claim 10, further comprising an additional storage device that stores table data for provisionally recording a correspondence between each music piece stored in the storage device and other music piece stored in the storage device such that the recorded correspondence indicates the musical compatibility of the music pieces with each other, and wherein the controller device searches the table data so as to select the second music piece corresponding to the first music piece to thereby ensure the musical compatibility of the second music piece with the first music piece.

14. A method of jointly playing music pieces by processing song data comprising the steps of:

provisionally storing song data representing a plurality of music pieces;

designating a first music piece as an object of the joint play among the plurality of the music pieces;

automatically selecting at least a second music piece, being different from the first music piece, from the plurality of the music pieces as another object of the joint play such that the second music piece has a musical compatibility with the first music piece;

processing the song data of the first music piece and the song data of the second music piece so as to merge the second music piece to the first music piece; and jointly playing the first music piece and the second music piece based on the processed song data such that the second music piece is reproduced in harmonious association with the first music piece due to the musical compatibility of the second music piece with the first music piece.

15. The method according to claim 14, further comprising the step of provisionally storing reference data representative of a music property of the stored music pieces, and wherein the step of automatically selecting examines the reference data of each of the stored music pieces so as to select the second music piece having a music property harmonious with that of the first music piece to thereby ensure the musical compatibility of the second music piece with the first music piece.

16. The method according to claim 14, wherein the step of automatically selecting analyzes a music property of the first music piece so as to select the second music piece having a music property harmonious with the analyzed music property of the first music piece to thereby ensure the musical compatibility of the second music piece with the first music piece.

17. The method according to claim 14, further comprising the step of provisionally storing table data to record a correspondence between each of the stored music pieces and other of the stored music pieces such that the recorded correspondence indicates the musical compatibility of the stored music pieces with each other, and wherein the step of automatically selecting searches the table data so as to select the second music piece corresponding to the first music piece to thereby ensure the musical compatibility of the second music piece with the first music piece.

18. A machine readable medium for use in a music apparatus having a CPU for jointly playing music pieces by processing song data, the medium containing program instructions executable by the CPU for causing the music apparatus to perform the method comprising the steps of:

providing song data representing a plurality of music pieces;

designating a first music piece as an object of the joint play among the plurality of the music pieces;

automatically selecting at least a second music piece, being different from the first music piece, from the plurality of the music pieces as another object of the joint play such that the second music piece has a musical compatibility with the first music piece;

processing the song data of the first music piece and the song data of the second music piece so as to merge the second music piece to the first music piece; and jointly playing the first music piece and the second music piece based on the processed song data such that the second music piece is reproduced in harmonious association with the first music piece due to the musical compatibility of the second music piece with the first music piece.

19. The machine readable medium according to claim 18, wherein the method further comprises the step of providing reference data representative of a music property of the music pieces, and wherein the step of automatically selecting examines the reference data of each piece so as to select the second music piece having a music property harmonious with that of the first music piece to thereby ensure the musical compatibility of the second music piece with the first music piece.

20. The machine readable medium according to claim 18, wherein the step of automatically selecting analyzes a music property of the first music piece so as to select the second music piece having a music property harmonious with the analyzed music property of the first music piece to thereby ensure the musical compatibility of the second music piece with the first music piece.

21. The machine readable medium according to claim 18, wherein the method further comprises the step of providing table data to record a correspondence between each of the music pieces and other of the music pieces such that the recorded correspondence indicates the musical compatibility of the music pieces with each other, and wherein the step of automatically selecting searches the table data so as to select the second music piece corresponding to the first music piece to thereby ensure the musical compatibility of the second music piece with the first music piece.

* * * * *